US012242218B2

(12) United States Patent
Tanto

(10) Patent No.: US 12,242,218 B2
(45) Date of Patent: Mar. 4, 2025

(54) FIXING DEVICE

(71) Applicant: CANON KABUSHIKI KAISHA, Tokyo (JP)

(72) Inventor: Tomoaki Tanto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/513,186

(22) Filed: Nov. 17, 2023

(65) Prior Publication Data

US 2024/0210863 A1 Jun. 27, 2024

(30) Foreign Application Priority Data

Dec. 27, 2022 (JP) ................................ 2022-209571

(51) Int. Cl.
*G03G 15/20* (2006.01)

(52) U.S. Cl.
CPC ..... *G03G 15/2053* (2013.01); *G03G 15/2064* (2013.01); *G03G 2215/2035* (2013.01)

(58) Field of Classification Search
CPC ...................... G03G 15/2053; G03G 15/2064
USPC ................................ 399/122, 320, 328, 329
See application file for complete search history.

(56) References Cited

U.S. PATENT DOCUMENTS

| | | | | |
|---|---|---|---|---|
| 10,712,696 | B2 * | 7/2020 | Takazawa | G03G 15/2057 |
| 2016/0161891 | A1 | 6/2016 | Tanto | G03G 15/20 |
| 2018/0253054 | A1 | 9/2018 | Tanto | G03G 15/20 |
| 2020/0183310 | A1 | 6/2020 | Tanto | G03G 15/20 |
| 2022/0253009 | A1 | 8/2022 | Takematsu et al. | G03G 15/20 |

FOREIGN PATENT DOCUMENTS

| | | | |
|---|---|---|---|
| CN | 103186081 | * | 7/2013 |
| JP | 2019128507 | * | 8/2019 |
| JP | 2020-071413 | | 5/2020 |

* cited by examiner

*Primary Examiner* — Hoan H Tran
(74) *Attorney, Agent, or Firm* — Venable LLP

(57) ABSTRACT

A fixing device includes an endless fixing belt, a heater provided inside of the fixing belt, a rotatable pressing member contacting an outer peripheral surface of the fixing belt and configured to form a fixing nip portion, and a holding member to hold the heater by an adhesive. The holding member includes a first portion to which the adhesive is applied and a second portion in a region different from the first portion. In a state in which the fixing device is a new state, the heater and the holding member are adhered by the adhesive applied in the first portion. In a state in which the fixing device is reused from the new state, the heater and the holding member are adhered by the adhesive applied in the second portion.

9 Claims, 5 Drawing Sheets

(a)

(b)

FIXING DEVICE

FIELD OF THE INVENTION AND RELATED ART

The present invention relates to a fixing device which heats and fixes a toner image on a sheet.

In recent years, a film fixing method which fixes an unfixed toner image on a recording material via a film (belt) which is heated by a heater has been widely used as a fixing device which fixes an unfixed toner image by heating and melting. Since it is possible to form a wider nip without increasing a size of the device by the film fixing method when it is compared to a roller fixing method, it is possible to shorten waiting time, downsize the device and satisfy high speed operation. Fixing devices of the film fixing method which include a heater which includes a heating member which is provided on a board, a cylindrical fixing film which rotates while its inner surface contacts the heater, a holding member which holds the heater, and a lubricant which intervenes between the heater and the film are known (see Japanese Patent Application Laid-Open No. 2020-71413). In the fixing device, the heater and the holding member are bonded to each other by an adhesive.

In fixing devices of a film heating method, a fixing film often determines a product life. The fixing film needs to be replaced several times during a warranty use period of the image forming apparatus, and when it is replaced, it is replaced as a fixing unit which includes the fixing film. Since the fixing film often determines the product life of the fixing unit which has been used, parts other than the fixing film are often reusable. In order to use limited resources effectively, it is desirable to select reusable parts and units from products which have been used, and reuse and recycle them to correspond to achieving a resource recycling society.

However, in the fixing device which is described in the JP 2020-71413 which is described above, the adhesive strength of the adhesive which is applied between the heater and the holding member may decrease with long term use due to the lubricant which is applied on an inner surface of the film. Therefore, the heater may be peeled off from the holding member in a case that a load is applied in a direction of peeling the heater off from the holding member when cleaning the lubricant which is attached on the heater which has been used in a process in order to reuse parts. In a case that the heater is peeled off from the holding member in this way, the desired adhesive strength may not be obtained as the adhesive is overcoated even when it is adhered again. Thus, it is difficult to reuse the heater and the holding member in the case that the heater is peeled off from the holding member.

A principal object of the present invention is to provide a fixing device which is capable of improving a reuse rate of members in a fixing unit which has been used.

SUMMARY OF THE INVENTION

According to an aspect of the present invention, there is provided a fixing device comprising: an endless and rotatable fixing belt; a heater provided inside of the fixing belt and configured to heat the fixing belt; a rotatable pressing member contacting an outer peripheral surface of the fixing belt and configured to form a fixing nip portion, the rotatable pressing member fixing a toner image on a recording material with the belt; and a holding member configured to hold the heater by an adhesive, the holding member including a first portion to which the adhesive is applied and a second portion in a region different from the first portion, wherein in a state in which the fixing device is a new state, the heater and the holding member are adhered by the adhesive applied in the first portion, and wherein in a state in which the fixing device is reused from the new state, the heater and the holding member are adhered by the adhesive applied in the second portion.

Further features of the present invention will become apparent from the following description of exemplary embodiments with reference to the attached drawings.

Figure 1:
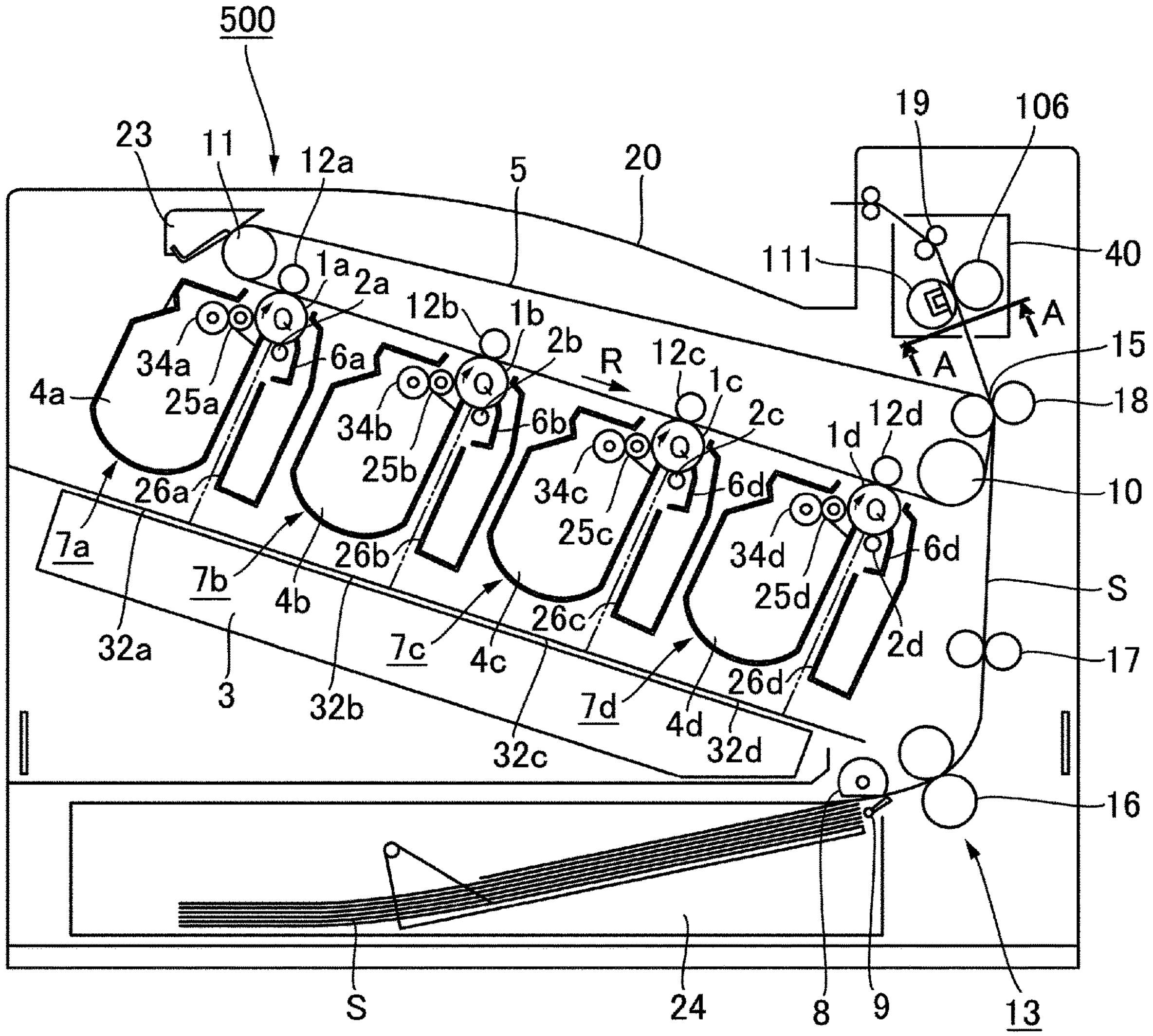
FIG. 1 is a sectional view showing an image forming apparatus according to an embodiment of the present invention.
Figure 2:
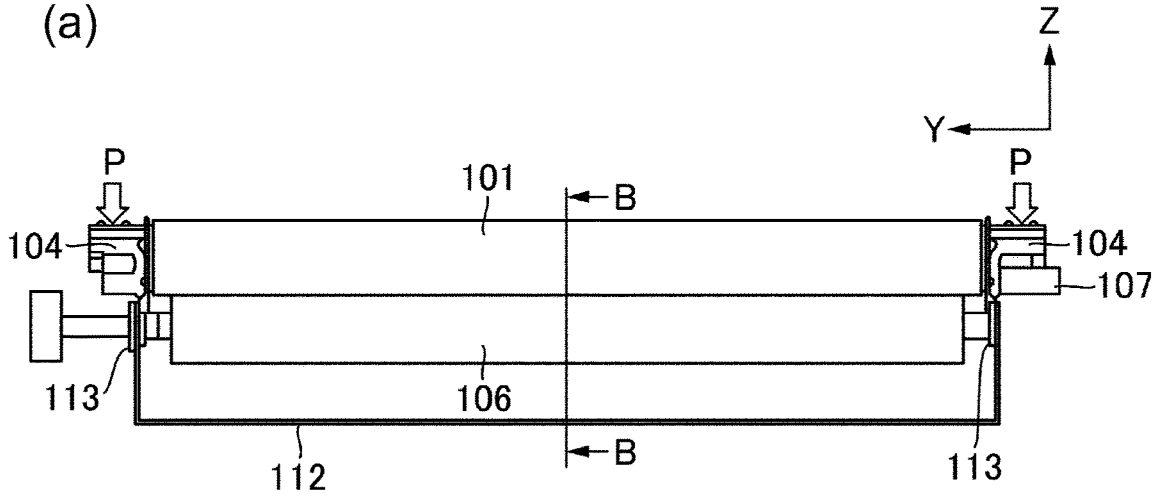
Figure 2:
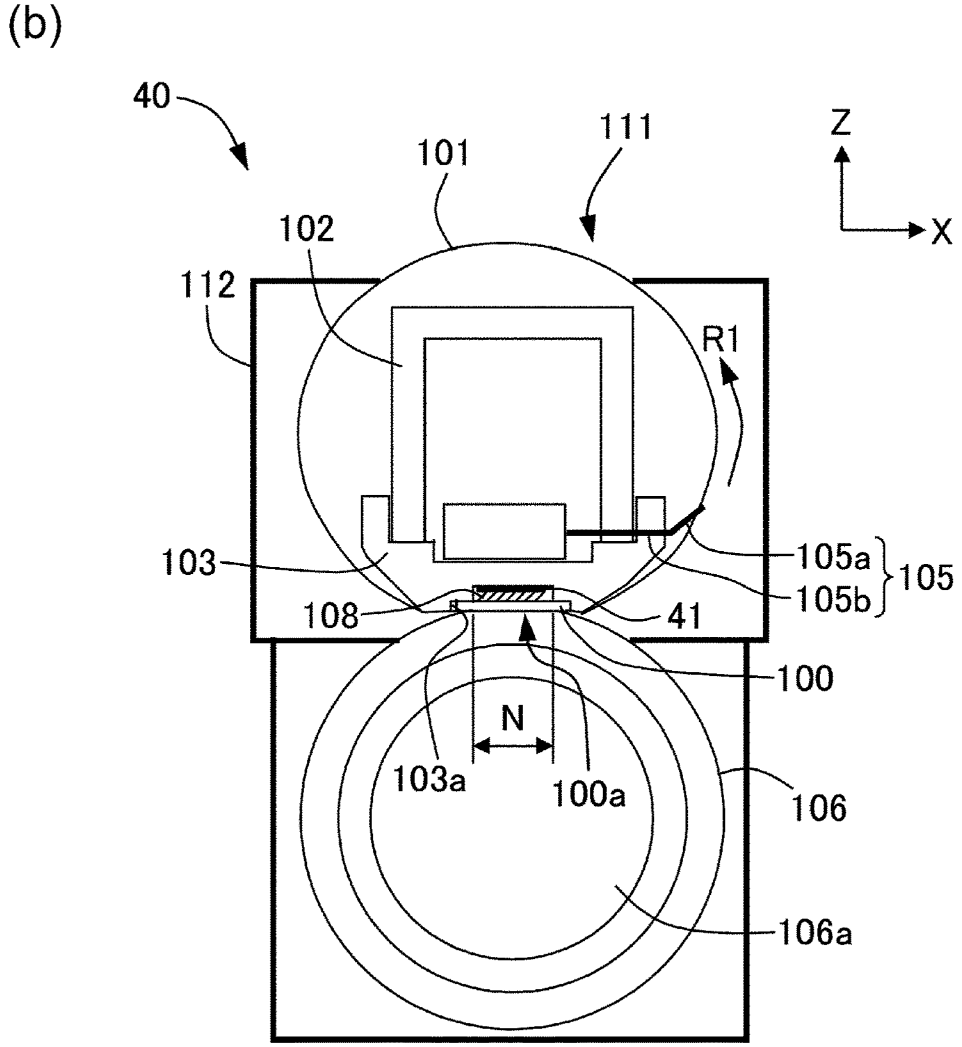

Part (a) and part (b) of FIG. 2 are views showing a fixing unit according to the embodiment of the present invention, part (a) of FIG. 2 is a side view when it is cut along the A-A line in FIG. 1, and part (b) of FIG. 2 is a sectional view when it is cut along the B-B line in part (a) of FIG. 2.

Figure 3:
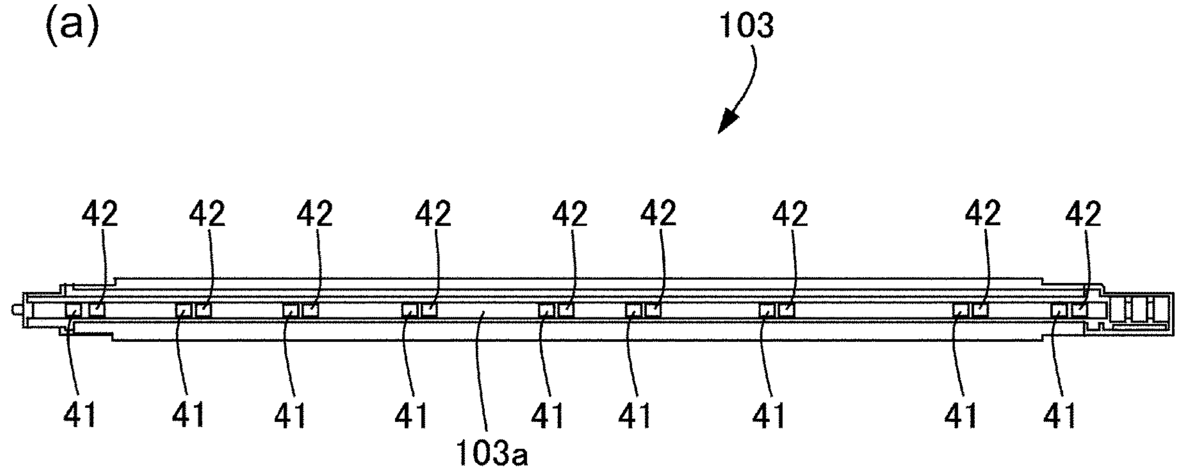
Figure 3:
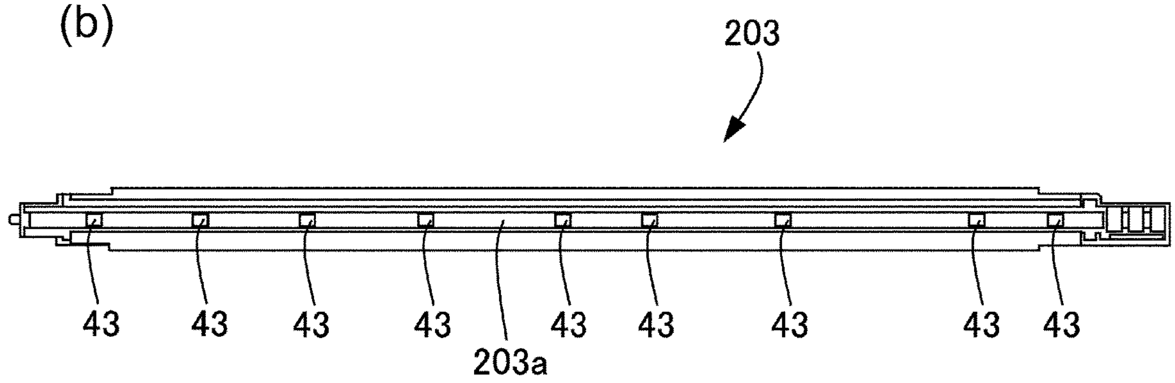

Part (a) of FIG. 3 is a bottom view showing a holding member according to the embodiment of the present invention, and part (b) of FIG. 3 is a bottom view showing a holding member according to a comparative example of the present invention.

Figure 4:
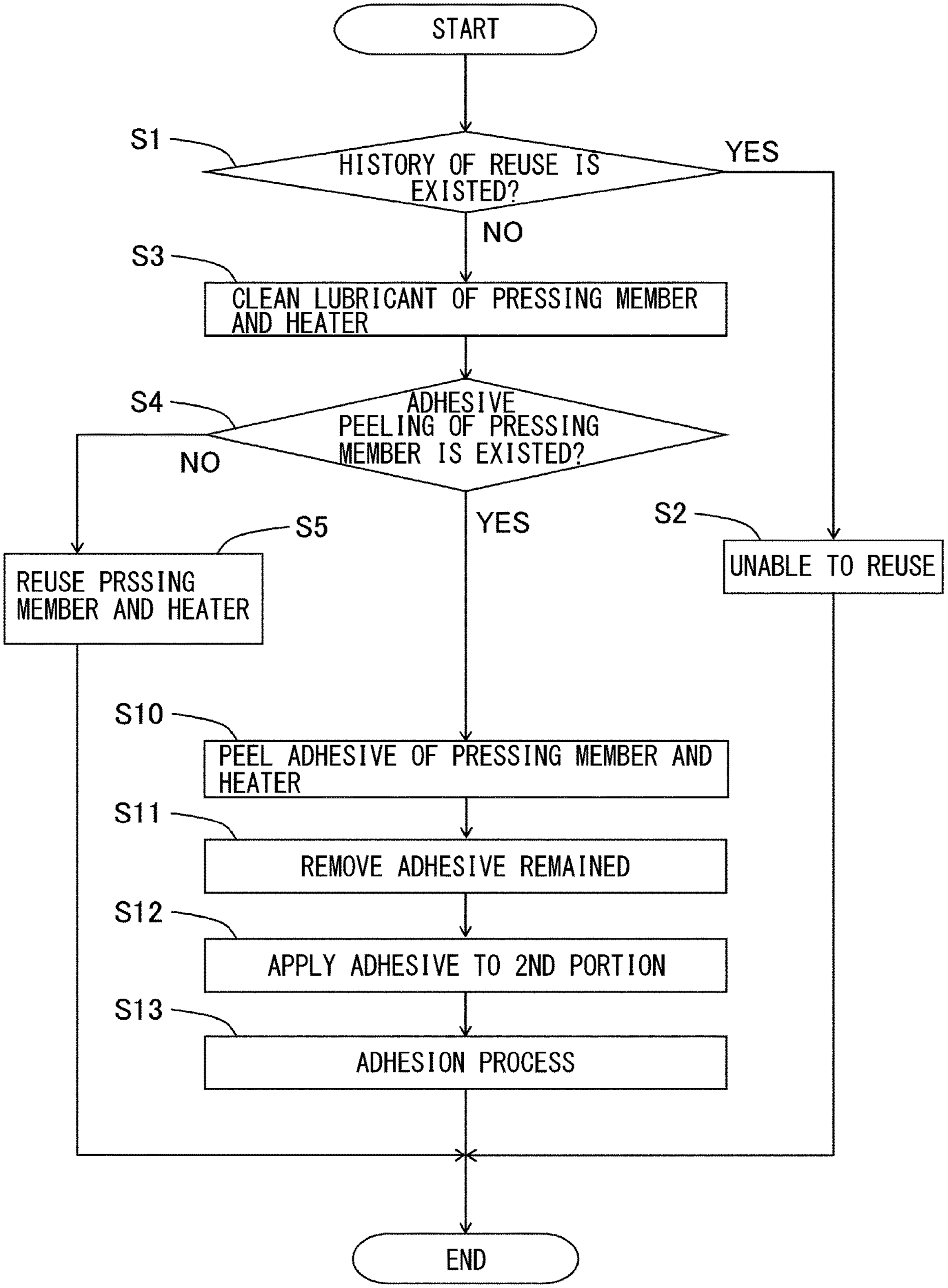

FIG. 4 is a flowchart showing a procedure for reusing a press contact member and a heater according to an example of the present invention.

Figure 5:
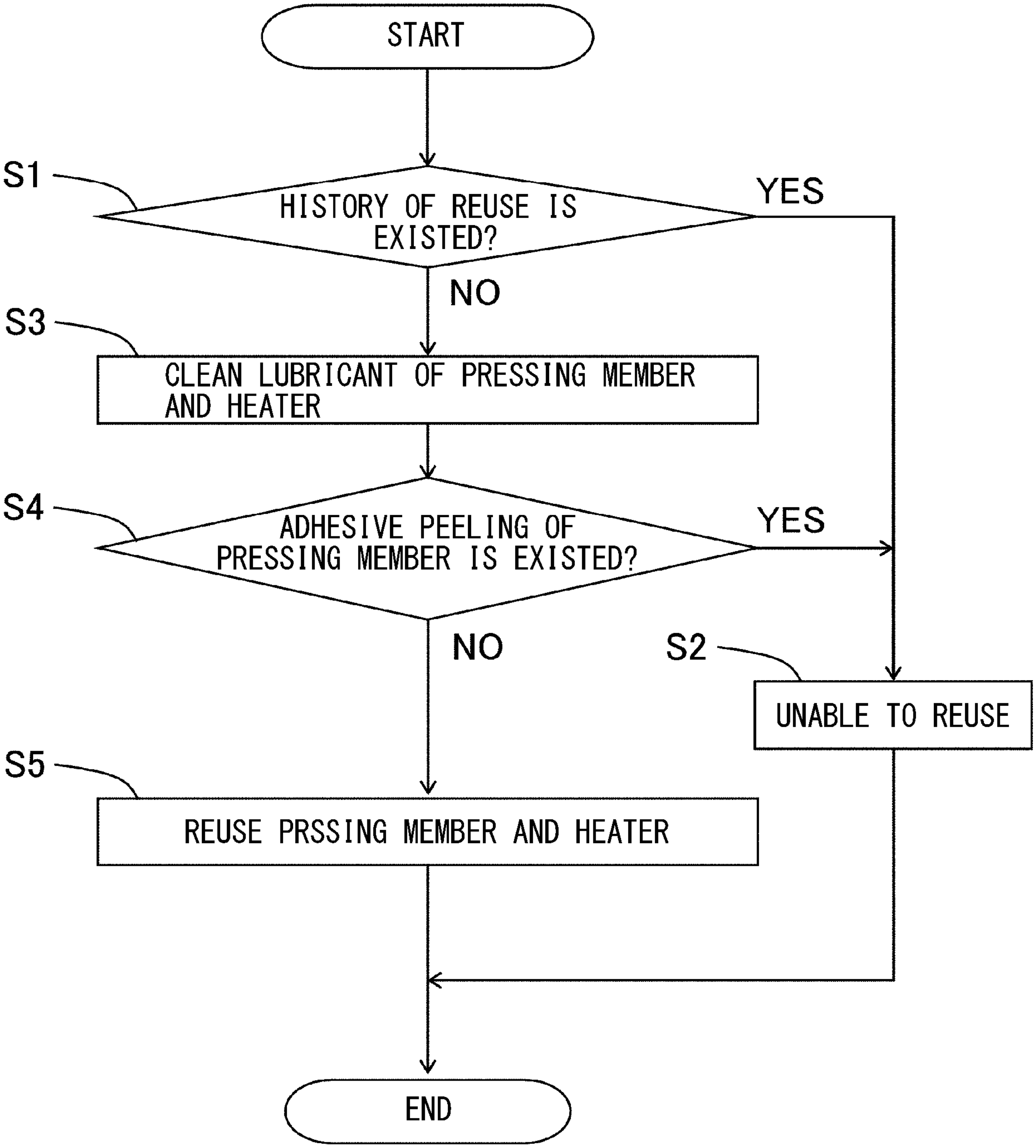

FIG. 5 is a flowchart showing a procedure for reusing a press contact member and a heater according to the comparative example of the present invention.

DESCRIPTION OF THE EMBODIMENTS

In the following, an embodiment of the present invention will be described with reference to FIG. 1 through FIG. 5. First of all, a schematic configuration of the image forming apparatus according to the embodiment will be described by using FIG. 1. Incidentally, in the embodiment, a full color copier in which a plurality of photosensitive drums are provided is applied. However, the present invention is not limited to the image forming apparatus, but may be applied to monochrome or single color copiers or printers in which a single photosensitive drum is provided.

Image Forming Apparatus

An image forming apparatus 500 according to the embodiment of the present invention is a full color printer of an electrophotographic method and a tandem type which is provided with four cartridges 7*a*, 7*b*, 7*c* and 7*d* which include photosensitive drums 1*a*, 1*b*, 1*c* and 1*d* respectively as image bearing members. The image forming apparatus 500 forms a toner image (image) on a recording material in accordance with an image signal from a document reading device (not shown) which is connected to a main assembly or a host device such as a personal computer which is connected to the main assembly so as to enable communication. Examples of the recording materials include sheet materials such as paper, plastic film, cloth. Further, the cartridges 7*a*, 7*b*, 7*c* and 7*d* form toner images of yellow, magenta, cyan and black, respectively.

Incidentally, the four cartridges 7*a*, 7*b*, 7*c* and 7*d* with which the image forming apparatus 500 is provided include substantially a same configuration, except that developing colors are different. Therefore, the cartridge 7*a* will be described as a representative cartridge, and the other cartridges will be described by replacing a subscript of a code "a" for a configuration in the cartridge 7a with b, c or d, respectively, and descriptions will be omitted.

The cartridge 7a is provided with a drum unit 26a which includes a photosensitive drum 1a as an image bearing member and a photosensitive member for electrophotography, and a developing unit 4a. The photosensitive drum 1a is rotationally driven by a driving member (not shown) in a clockwise direction (a direction of an arrow Q) in FIG. 1. Further, around the photosensitive drum 1a, a cleaning member 6a, a charging roller 2a, and the developing unit 4a are arranged in order of its rotational direction.

The charging roller 2a uniformly charges a surface of the photosensitive drum 1a. After the surface of the photosensitive drum 1a is charged by the charging roller 2a, a laser beam is exposed on the surface of the photosensitive drum 1a from a scanner unit (exposure means) 3 through unit openings from 32a through 32d. In this way, an electrostatic latent image is formed on the surface of the photosensitive drum 1a. Incidentally, in the embodiment, the scanner unit 3 is arranged below the cartridges from 7a through 7d.

The developing unit 4a supplies toner to the electrostatic latent image which is formed on the photosensitive drum 1a and develops the electrostatic latent image as a toner image. The developing unit 4a is provided with a developing roller 25a which contacts the photosensitive drum 1a and supplies toner to the surface of the photosensitive drum 1a, and a supplying roller 34a which contacts the developing roller 25a and supplies toner to the developing roller 25a.

When forming an image on the recording material S, first of all, the electrostatic latent image which is formed on the surface of the photosensitive drum 1a by the scanner unit 3 is developed as a toner image by the developing unit 4a and transferred to an intermediary transfer belt 5.

The intermediary transfer belt 5 as an intermediary transfer member is stretched by a driving roller 10, a tension roller 11, etc., and driven in a direction of an arrow R in FIG. 1. Further, opposing to each of the photosensitive drums from 1a through 1d, primary transfer rollers from 12a through 12d are arranged inside the intermediary transfer belt 5, and are configured so that a transfer bias is applied by an unshown power source (bias applying means). For example, in a case that a toner which is charged with negative polarity is used, the toner image is primarily transferred onto the intermediary transfer belt 5 sequentially by applying a bias of positive polarity to the primary transfer rollers from 12a through 12d. Further, on a downstream side of the tension roller 11 with respect to a rotational direction of the intermediary transfer belt 5, a secondary transfer roller 18 as a secondary transfer member is arranged so as to contact an outer peripheral surface of the intermediary transfer belt 5, and a secondary transfer portion 15 is formed between the intermediary transfer belt 5 and the secondary transfer roller 18.

The cleaning member 6a removes a residual toner on the photosensitive drum 1a after the toner image which is formed on the photosensitive drum 1a is transferred onto the intermediary transfer belt 5. The toner which is removed by the cleaning member 6a is collected in a removed toner chamber in the drum unit 26a.

The toner image on each of the photosensitive drums from 1a through 1d is overlapped on the intermediary transfer belt 5 and primarily transferred. And the four color toner images are conveyed to the secondary transfer portion 15 while the four color toner images are overlapped on the intermediary transfer belt 5. In the secondary transfer portion 15, the toner image is secondarily transferred from the intermediary transfer belt 5 to the recording material S. A toner which remains on the intermediary transfer belt 5 after secondary transfer to the recording material S is removed by a belt cleaning device 23, and the removed toner passes through a waste toner conveying passage (not shown) and is collected in a waste toner collecting container (not shown).

On the other hand, in synchronization with the image forming operation which is described above, the recording material S is fed toward the secondary transfer portion 15 by a conveying mechanism which is configured of a feeding device 13, a registration roller pair 17, etc. The feeding device 13 includes a feeding cassette 24 which accommodates the plurality of recording material S, a feeding roller 8 which feeds the recording material S, and a feeding roller pair 16 which feeds the recording material S which is fed.

The feeding cassette 24 is configured so as to be dismountable from the main assembly of the image forming apparatus 500. A user pulls out the feeding cassette 24 and removes it from the main assembly, and then loads the recording material S, inserts it into the main assembly, and completes supplement of the recording material S. A recording material S which is positioned at an uppermost position of the recording materials S which are accommodated in the feeding cassette 24, is pressed by the feeding roller 8 and peeled off one by one by a separating pad 9 (friction peeling method) as the feeding roller 8 rotates and the recording material S is conveyed.

And the recording material S which is fed from the feeding device 13 is conveyed to the secondary transfer portion 15 by the registration roller pair 17. In the secondary transfer portion 15, it is possible to secondarily transfer a four color toner image on the intermediary transfer belt 5 to the recording material S which is conveyed by applying a positive polarity bias to the secondary transfer roller 18.

And the recording material S which is fed from the secondary transfer portion 15 is further conveyed to a fixing device 40. The fixing device 40 applies heat and pressure to the toner image which is borne on the recording material S and fixes the toner image on the recording material S. After that, the recording material S in which the toner image is fixed is discharged to a discharging tray 20 by a discharging roller pair 19.

Fixing Device

Next, a configuration of the fixing device 40 according to the embodiment will be described by using part (a) and part (b) of FIG. 2. Part (a) of FIG. 2 shows a sectional view of the fixing device 40 with respect to a longitudinal direction according to the embodiment (A-A sectional view in FIG. 1), and part (b) of FIG. 2 shows a sectional view of the fixing device 40 with respect to a short direction (B-B sectional view in part (a) of FIG. 2). The fixing device 40 is a fixing device which is a film heating type which uses a film-like fixing belt 101 in which an elastic layer is formed on a cylindrical thin-walled metal base layer, and a pressure roller driving type in which the fixing belt 101 is driven by a pressing roller 106.

The fixing device 40 includes the fixing belt 101, the pressing roller 106, a heater 100 which is an example of a heating member, a press contact member 103, a stay 102, a fixing flange 104 and a holding member 107. Then, the recording material S which is fed to a fixing nip portion N which is formed by the fixing belt 101 and the pressing roller 106 is heated and a toner image which is borne on the recording material S is fixed on the recording material S.

Hereafter, a combination of the fixing belt 101, the heater 100, the press contact member 103, the stay 102 and the fixing flange 104 is defined as a film unit 111. Further, in the embodiment, a short direction of the film unit 111 is defined as X direction, a longitudinal direction of the film unit 111 is defined as Y direction and a pressing direction of the film unit 111 which will be described below is defined as Z direction. Incidentally, the longitudinal direction (a horizontal direction in part (a) of FIG. 2) is a direction which intersects a conveying direction of the recording material S which is conveyed in the fixing nip portion N, and is also a width direction which intersects a rotational direction of the fixing belt 101. Next, each configuration will be described in detail.

Fixing Belt

The fixing belt 101, which is an endless belt as a fixing member, is a cylindrical heat resistant fixing film which transfers heat to the recording material S, and externally engaged with the press contact member 103. Film thickness of the fixing belt 101 is 100 μm or less, and preferably 50 μm or less and 20 μm or more, in order to reduce a heat capacity and improve quick start performance. Further, the fixing belt 101 is possible to use a single layer of heat resistant PTFE, PFA, or FEP, or a composite layer film in which PTFE, PFA or FEP, etc. are coated on an outer peripheral surface of polyimide, polyamideimide, PEEK, PES or PPS, etc. It is also possible to use metal.

The fixing belt 101 which is described above fixes the toner image on the recording material by rotating, contacting the recording material S and heating the toner image which are borne on the recording material S. As will be described below, the fixing belt 101 rotates in a direction of an arrow R1 in FIG. 3, driven by the pressing roller 106.

Pressing Roller

The pressing roller 106 as an opposing rotatable member which opposes the fixing member is configured, as shown in part (b) of FIG. 2, of a metal core 106*a* which is made of metal, an elastic layer 106*b* which is formed and coated concentrically and integrally around the metal core 106*a* in a roller shape, and a mold release layer which is provided on a surface layer of the elastic layer 106*b*. The elastic layer 106*b* is a layer which has heat resistance and elasticity such as silicone rubber, fluororubber or fluororesin. For the mold release layer, it is possible to select materials with good mold release and heat resistance such as fluororesin, silicone resin, fluorosilicone rubber, fluororubber, silicone rubber, PFA, PTFE and FEP.

As shown in part (a) of FIG. 2, a bearing member 113 which is made of heat resistant resin such as PEEK, PPS and liquid crystal polymer is mounted on both end portions of the metal core 106*a*. And the pressing roller 106 is rotatably supported on a side plate of a fixing frame 112 by the bearing member 113. Further, the pressing roller 106 is rotationally driven by an unshown fixing motor which is provided in the main assembly. The fixing belt 101 rotates in the direction of the arrow R1 in part (b) of FIG. 2, driven by the pressing roller 106. The pressing roller 106 is an example of the opposing rotatable member which forms the fixing nip portion N which nips and conveys the sheet between the pressing roller 106 and the fixing belt 101.

Heater

The heater 100 as a heating member is arranged inside the fixing belt 101 and is a heating source which heats the fixing belt 101, and a ceramic heater is used in the embodiment. The fixing belt 101 slides while its inner peripheral surface contacts the heater 100. A basic configuration of the heater 100 is a combination of a thin plate shaped ceramic board which is long and narrow with respect to the longitudinal direction and a conduction heat generating resistor layer which is provided with the board, and is a heater with low heat capacity which raises temperature sharply as a whole by supplying power from the main assembly to the heating member.

Press Contact Member

The press contact member 103 is arranged inside the fixing belt 101 and forms the fixing nip portion N between the press contact member 103 and the pressing roller 106 via the fixing belt 101. The press contact member 103 is a heat resistant and heat insulating member whose sectional shape is a substantially semicircular arc which is perpendicular to the longitudinal direction. As for the press contact member 103, it is preferable to use materials with good insulating and heat resistance properties such as phenol resin, polyimide resin, polyamide resin, polyamideimide resin, PEEK resin, PES resin, PPS resin, PFA resin, PTFE resin and LCP resin.

The press contact member 103 forms the fixing nip portion N between the fixing belt 101 and the pressing roller 106 by pressing and contacting the fixing belt 101 with the pressing roller 106 while the press contact member 103 backs up the fixing belt 101. And it has functions of pressing the fixing nip portion N and achieving conveying stability while the fixing belt 101 rotates. Further, the heater 100 which is described above is fitted and held in a fitting groove 103*a* which is formed on a lower surface of the press contact member 103 along the longitudinal direction, and the press contact member 103 also functions as a holding member which holds the heater 100. As for a configuration of the heater 100 and the press contact member 103, the heater 100 is fixed to the press contact member 103 for a purpose of stabilizing a contact function of the heater 100. The heater 100 is arranged to oppose the fixing nip portion N via the fixing belt 101.

In the embodiment, the heater 100 is configured to be adhered to the press contact member 103 by applying an adhesive 108 to a plurality of first adhesive applied surfaces (hereinafter simply referred to as first portions) 41 along the longitudinal direction of the press contact member 103. That is, the press contact member 103 is an example of a holding member which holds the heater 100 which is attached by the adhesive 108. A surface shape of the first portion 41 is a projection-recess surface which includes small projections and recesses such as embosses or knurling shapes by applying surface treatment, in order to make it difficult to peel off the adhesive which is adhered to the surface. Therefore, it is possible to enhance adhesive strength of the heater 100 to the adhesive surface 100*a*. A method how to adhere to the heater 100 and the press contact member 103 will be described in detail below. Incidentally, as for the surface shape of the first portion 41, other than above, it is possible to include a surface that is rougher than other portions of the first portion 41 and a surface that is higher than other portions.

Stay

The stay 102 is arranged inside the fixing belt 101 along the longitudinal direction in order to ensure a strength of the press contact member 103. That is, the stay 102 is made of relatively flexible resin and a member in order to increase strength of the press contact member 103 in the longitudinal direction and to correct the press contact member 103 by pressing against a back surface of the press contact member 103 (a surface on an opposite side of a side on which the heater 100 is arranged).

Fixing Flange

The fixing flanges 104 as holding portions are mounted at both end portions of the cylindrical fixing belt 101 in the longitudinal direction and regulates an amount of movement of the fixing belt 101 in the longitudinal direction. That is, the fixing flange 104 is fitted into both ends of an assembly of the press contact member 103 and the stay 102, and the fixing flange 104 prevents the fixing belt 101 from slipping out while the fixing flange 104 guides a rotation of the fixing belt 101. In other words, the fixing flange 104 rotatably holds the fixing belt 101.

In FIG. 2, the fixing flanges 104 which are arranged at both ends of the fixing belt 101 in the longitudinal direction are pressed in a direction of an arrow P by pressing plates (not shown) which are rotatably mounted with respect to the fixing frame 112, respectively. In this way, the film unit 111 is pressed toward the pressing roller 106.

Thermistor

A thermistor 105 detects an inner surface temperature of the fixing belt 101 and feeds back it to an unshown control circuit. The thermistor 105 includes a temperature detecting element portion **105*a* and a plate spring portion 105*b*. The temperature detecting element portion 105*a* includes a holding portion for attaching and holding by fixing to the press contact member 103 and a temperature detecting element, and detects temperature by contacting an inner surface of the fixing belt 101. The plate spring portion 105*b* has elasticity to urge the temperature detecting element portion 105*a* to the fixing belt 101 with a predetermined contact pressure. The plate spring portion 105*b*** is made of stainless steel and also a conduction path for the temperature detecting element.

Lubricant

Lubricant is selected from materials which have sliding properties to reduce sliding resistance between the fixing belt 101 and the heater 100 and in which performance degradation is low even when it is used at high temperature. An example of lubricants which satisfy such conditions is fluorine grease. Fluorine grease consists of fluorooil and fluororesin, and is able to satisfy high sliding properties due to the oil's lubricity and high durability as the fluororesin maintains the fluorooil.

Adhesive Configuration of the Press Contact Member and the Heater

Next, when the press contact member 103 and the heater 100 in new conditions according to the embodiment are used, an adhesive configuration of the press contact member 103 and the heater 100 will be described. Part (a) of FIG. 3 is a bottom view showing the first portion 41 which is provided with the press contact member 103 according to the embodiment. In part (a) of FIG. 3, the first portion 41 of the press contact member 103 is used when assembling in new conditions and is provided at nine locations spaced from each other in the longitudinal direction in the fitting groove **103*a*. Further, alongside each of the first portions 41, second adhesive applied surfaces (hereinafter simply referred to as second portions) 42 are provided at nine locations spaced from each other in the longitudinal direction. That is, the plurality of first portions 41 and the plurality of second portions 42 are provided respectively, and the first portions 41 and the second portions 42 are arranged alternately with respect to the longitudinal direction of the heater 100 and the press contact member 103. Incidentally, orders of the first portions 41 and the second portions 42** are not limited to alternating.

In the embodiment, the plurality of first portions 41 and the plurality of second portions 42 are arranged at equal intervals, respectively. In this way, it is possible to obtain equal adhesive strength at any point with respect to the longitudinal direction of the heater 100 and the press contact member 103, and the heater 100 is stably held against sliding of the fixing belt 101. Further, the plurality of first portions 41 and the plurality of second portions 42 are arranged in equal numbers, respectively. In this way, it is possible to equate adhesive strength of the heater 100 to the press contact member 103 in a new condition and a renewed condition, and the heater 100 is stably held against sliding of the fixing belt 101.

The second portion 42 is a portion to be used when the heater 100 is adhered to the press contact member 103 again in a case that the heater 100 is detached from the press contact member 103 in a process of reusing the used press contact member 103 and the used heater 100. Similar to the first portion 41, a surface shape of the second portion 42 is a projection-recess surface which includes small projections and recesses such as embosses or knurling shapes by applying surface treatment, in order to make it difficult to peel off the adhesive which is adhered to the surface. Incidentally, as for the surface shape of the second portion 42, other than above, it is possible to include a surface that is rougher than other portions of the second portion 42 and a surface that is higher than other portions.

A total of 18 locations of the adhesive applied surfaces are provided on the first portions 41 and the second portions 42. In the embodiment, both of the first portions 41 and the second portions 42 are substantially square in shape. However, it is not limited to this and may be rectangular or circular in shape. Here, the first portion 41 is an example of a first adhesive applied portion which opposes the adhesive surface **100*a* which is formed on the heater 100 and is adhered to the adhesive surface 100*a* when the adhesive 108 is applied. The second portion 42 is an example of a second adhesive applied portion which opposes the adhesive surface 100*a* while it is arranged in a different position from the first portion 41 and is a projection-recess surface which is adhered to the adhesive surface 100*a* when the adhesive 108** is applied.

When assembling in a new condition, the adhesive 108 is applied only to the first portions 41 at the nine locations which are provided on the press contact member 103. At this time, the adhesive 108 is not applied to the second portions 42 at the nine locations. By fitting the heater 100 into the fitting groove **103*a*, the adhesive 108 which is applied to the first portions 41 adheres to the adhesive surface 100*a* of the heater 100, and the press contact member 103 and the heater 100 are adhered and attached by the adhesive 108. That is, the heater 100 is attached to the press contact member 103, in a state in which the first portion 41 is adhered on the adhesive surface 100*a* by the adhesive 108 and in a state in which the adhesive 108 is not applied on the second portion 42**.

The adhesive 108 which is used in the embodiment is a moisture-curable adhesive which cures by absorbing moisture in the air. For example, the heater 100 and the press contact member 103 are adhered to each other, when the adhesive 108 cures by absorbing moisture in the air while leaving in an environment with 80% humidity for five hours in a condition that the heater 100 and the press contact member 103 are closely attached. In the embodiment, adhesive strength per the first portion 41 at one location is set to be 5N or more, for example.

Reuse of Press Contact Member and Heater

Next, a procedure of reusing the press contact member 103 and the heater 100 will be described by comparing a comparative example with the embodiment. Here, a case, in which the number of times the heater 100 and the press contact member 103 are reused is one, will be described.

Comparative Example

Part (b) of FIG. 3 is a bottom view showing the adhesive applied surface 43 which is provided on the press contact member 203 according to the comparative example. In part (b) of FIG. 3, in the press contact member 203, the adhesive applied surfaces 43 which are used when assembling in a new condition are provided at nine locations on the fitting groove 203*a* by spacing intervals with respect to the longitudinal direction. In the comparative example, the second adhesive applied surface is not provided.

Next, the procedure of reusing the press contact member 203 and the heater 100 by using the press contact member 203 according to the comparative example will be described by using a flowchart which is shown in FIG. 5. First of all, it is determined whether or not there is a history that it has been reused, according to a history which is associated with the fixing unit which has been used and collected (step S1). Since the number of times the press contact member 203 and the heater 100 are reused is limited to one, in a case that it is determined that there is a history that they have been reused (YES in step S1), they are regarded as unavailable to reuse (step S2).

In a case that it is determined that there is no history that they have been reused (NO in step S1), old lubricant which is attached to the press contact member 203 and the heater 100 and has been used for a long time is cleaned (step S3). Since the adhesive between the heater 100 and the press contact member 203 may be peeled off during the cleaning process, it is determined whether the adhesive between the press contact member 203 and the heater 100 is peeled off after cleaning (step S4). In a case that it is determined that the adhesive between the press contact member 203 and the heater 100 is not peeled off (NO in step S4), they are reused as they are (step S5). In a case that it is determined that there are any locations which are peeled off among the nine locations in which the press contact member 203 and the heater 100 are adhered (YES in step S4), they are regarded as unavailable to reuse (step S2).

Here, in a case that the heater 100 is detached from the press contact member 203, it is necessary to adhere the heater and the press contact member 203 again by using adhesive and achieve the desired adhesive strength. However, when the adhesive is applied again while the adhesive is remained on the heater 100 and the press contact member 203, the desired adhesive strength may not be achieved since the adhesive is applied over the adhesive which has already been cured. Therefore, it is necessary to have a removal process in order to achieve the desired adhesive strength by removing the adhesive which is remained on the heater 100 and the press contact member 203 to the same condition as the new condition. However, there is a possibility that parts may be damaged, when trying to remove the adhesive which has entered a step between a heating member and a glass surface which are provided with the adhesive surface 100*a* of the heater 100, or the embosses and the gap of the small projection and recess shapes of the adhesive applied surface 43 which is provided on the press contact member 203. Therefore, in a case that the heater 100 is detached from the press contact member 203, it is not possible to be reused.

Therefore, in the embodiment, in addition to the first portion 41 which is used for adhesion when it is in a new condition, the second portion 42 which is used for adhesion when it is reused is provided, and after the adhesive of the first portion 41 is peeled off, the second portion 42 in which the adhesive has not been applied is used for adhesion. Incidentally, for example, in a case that a smooth surface other than the first portion 41 is adhered to the heater 100, since an adhesive strength per unit area is smaller than that of the first portion 41, it is necessary to apply the adhesive to a larger surface. In this case, it is not preferable since the cost is increased, the heat of the heater 100 is transferred to the press contact member 103, etc.

EXAMPLE

Next, a procedure of reusing the press contact member 103 and the heater 100 according to an example of the embodiment will be described by using a flowchart which is shown in FIG. 4. Incidentally, since steps from S1 through S5 are the same as in the comparative example, descriptions will be omitted. In a case that it is determined that there are any locations which are peeled off among the nine locations in which the press contact member 103 and the heater 100 are adhered (YES in step S4), it is necessary to adhere the press contact member 103 and the heater 100 again. For this reason, the adhesive is removed from all locations of the press contact member 103 and the heater 100 (step S10). And the adhesive 108 which is adhered to the heater 100 or the press contact member 103 is removed (step S11). As for the removal of the adhesive 108, it is sufficient that the adhesive 108 is removed to a state that the heater 100 does not contact the press contact member 103 via the adhesive 108 which is cured and attached, so it is not necessary that surface properties are the same as those of the parts in a new condition. That is, some adhesive residue is acceptable.

Next, the adhesive is applied to only the second portions 42 at the nine locations which are provided on the press contact member 103 (step S12). At this time, no adhesive is applied to the first portions 41 at the nine locations. And an adhering process is performed in which the heater 100 and the press contact member 103 are placed in an environment of 80% humidity for 5 hours while the heater 100 and the press contact member 103 are closely attached, and it is possible to reuse them (step S13).

As described above, according to the fixing device 40 in the embodiment, in a case that the adhesive between the first portion 41 and the adhesive surface 100*a* is peeled off, the second portion 42 is adhered to the adhesive surface 100*a* by the adhesive 108. The heater 100 and the press contact member 103 are attached while new adhesive is not applied to the first portion 41. Therefore, in a case that the heater 100 and the press contact member 103 are reused and used, even when the heater 100 is peeled off from the press contact member 103, it is possible to satisfy the desired adhesive strength by adhering the press contact member 103 and the heater 100 again. In this way, it is possible to reuse the heater 100 and the press contact member 103. As a result, it is possible to provide the fixing device 40 which utilizes resources effectively by improving a reuse rate of the used parts and reduces environmental impact.

Incidentally, in the embodiment which is described above, a ceramic heater is applied as a heat generating member and a case that the ceramic heater and the press contact member 103 are adhered is described, however, it is not limited to this. For example, a plate which is made of SUS, for instance, may be applied as the heat generating member such as an IH heating type fixing device, and this plate and the press contact member 103 may be adhered.

Further, in the embodiment which is described above, a case that the number of times to reuse the heater 100 and the press contact member 103 is one is described, however, it is not limited to this, and the number of times to reuse, for example, may be two or more. In this case, for example, in a case that the number of times to reuse is set to be two, a third adhesive applied surface is provided, and it is a configuration that the adhesive applied surfaces are increased by the number of times to reuse.

Further, in the embodiment which is described above, a case that the first portion 41 and the second portion 42 are formed on the press contact member 103 is described, however, it is not limited to this. For example, the first portion 41 and the second portion 42 may be formed on the heater 100. That is, one of the heater 100 and the press contact member 103 includes the first portion 41 and the second portion 42, and the other of the heater 100 and the press contact member 103 includes the adhesive surface 100*a* in which it is possible to adhere the first portion 41 and the second portion 42.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-209571 filed on Dec. 27, 2022, which is hereby incorporated by reference herein in its entirety.

What is claimed is:

1. A fixing device comprising:

an endless and rotatable fixing belt;

a heater provided inside of the fixing belt and configured to heat the fixing belt;

a rotatable pressing member contacting an outer peripheral surface of the fixing belt and configured to form a fixing nip portion, the rotatable pressing member fixing a toner image on a recording material with the belt; and a holding member configured to hold the heater by an adhesive, the holding member including a first portion to which the adhesive is applied and a second portion in a region different from the first portion, wherein in a state in which the fixing device is a new state, the heater and the holding member are adhered by the adhesive applied in the first portion, and wherein in a state in which the fixing device is reused from the new state, the heater and the holding member are adhered by the adhesive applied in the second portion.

2. A fixing device according to claim 1, wherein the first portion and the second portion have a projection-recess configuration.

3. A fixing device according to claim 2, wherein the holding member includes a plurality of first portions and a plurality of second portions, respectively, and wherein the plurality of first portions and the plurality of second portions are alternatively arranged with respect to a longitudinal direction of the fixing belt.

4. A fixing device according to claim 3, wherein the plurality of first portions and the plurality of second portions are arranged at equal intervals with respect to the longitudinal direction.

5. A fixing device according to claim 3, wherein the plurality of first portions and the plurality of second portions are arranged in the same number.

6. A fixing device according to claim 1, wherein in the state in which the fixing device is new, the adhesive is not applied in the second portion.

7. A fixing device according to claim 1, wherein the rotatable pressing member nips and conveys the recording material at the fixing nip portion with the heater via the fixing belt.

8. A fixing device comprising:

an endless and rotatable fixing belt;

a heater provided inside of the fixing belt with respect to a widthwise direction of the fixing belt and configured to heat the fixing belt;

a rotatable pressing member contacting an outer peripheral surface of the fixing belt and configured to form a fixing nip portion, the rotatable pressing member fixing a toner image on a recording material with the belt; and a holding member configured to hold the heater, the holding member including first portions and second portions arranged between both ends thereof and applied by surface treatment, respectively, wherein the heater and the holding member are adhered by the adhesive applied in the first portions and the adhesive is not applied in the second portions.

9. A fixing device comprising:

an endless and rotatable fixing belt;

a heater provided inside of the fixing belt with respect to a widthwise direction of the fixing belt and configured to heat the fixing belt;

a rotatable pressing member contacting an outer peripheral surface of the fixing belt and configured to form a fixing nip portion, the rotatable pressing member fixing a toner image on a recording material with the belt; and a holding member configured to hold the heater, the holding member including first portions and second portions arranged between both ends thereof and applied by surface treatment, respectively, wherein the heater and the holding member are adhered by the adhesive applied in the second portions and the heater and the holding member are not adhered by the adhesive remained in the first portions.

* * * * *